Patented Apr. 11, 1950

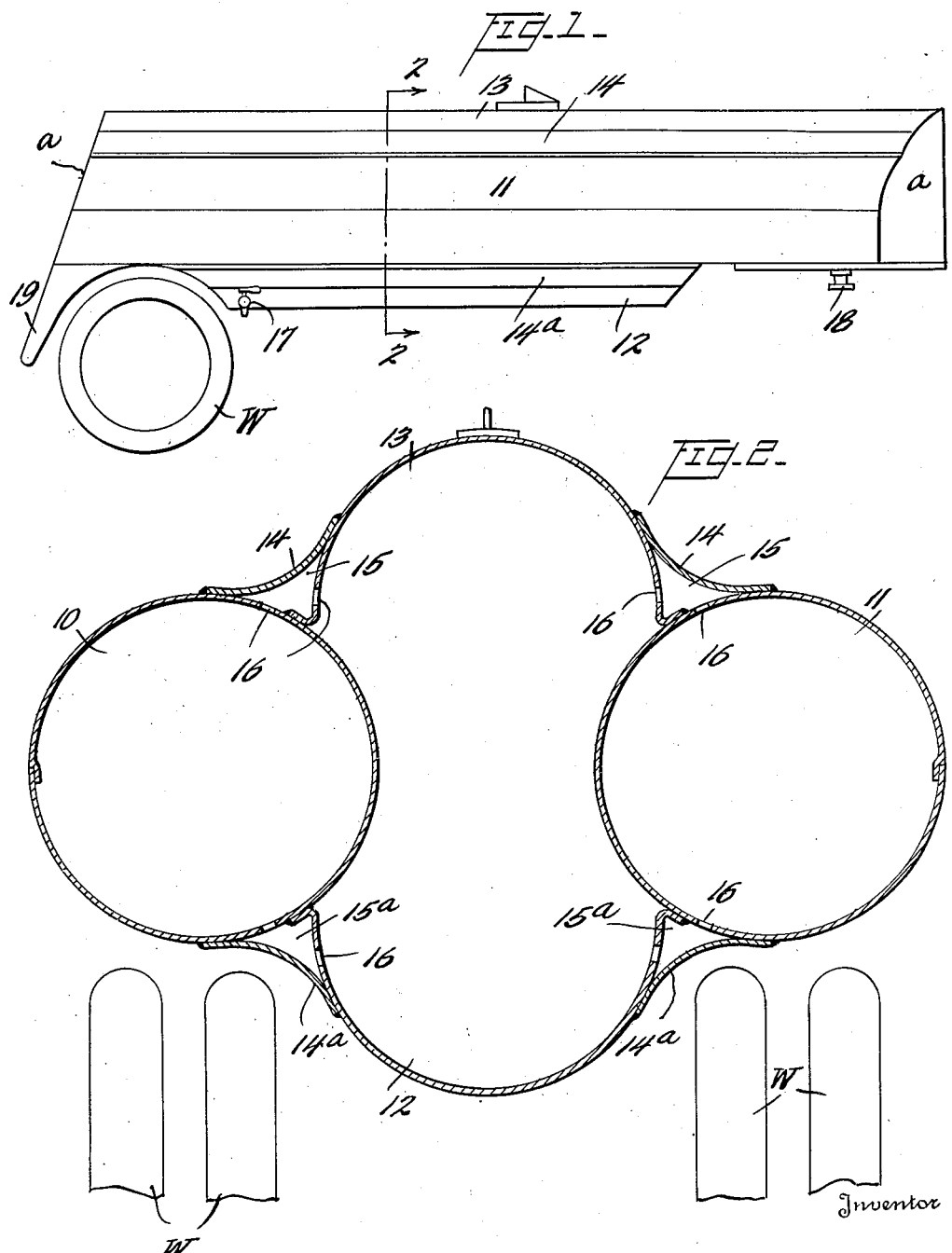

2,503,792

UNITED STATES PATENT OFFICE 2,503,792

TRUCK BODY

George M. Brandon, Tallahassee, Fla.

Application November 28, 1944, Serial No. 565,497

1 Claim. (Cl. 220—1)

This invention is a truck body of a type designed for transporting liquids, such as water, oil, gasolene and the like, and is equally adapted for use as a trailer truck design or as a four-wheeled truck design.

One of the objects of the invention is to provide a tank-truck body of great capacity, and having a capability of transporting larger and heavier loads for any given over-all dimensions than is possible with tank-trucks now in general use. A further object is to provide a truck body of the dual-tank type, so constructed and arranged that an intermediate tank is provided, which serves not only to increase the carrying capacity of the vehicle, but is so connected with a pair of laterally spaced tank sections as to join them in a manner to rigidly brace the entire structure.

The invention will be hereinafter fully set forth and particularly pointed out in the claim.

In the accompanying drawing—

Figure 1 is a more or less diagrammatic side elevation illustrating a truck body constructed in accordance with the invention.

Figure 2 is a vertical cross sectional view on the line 2—2, Figure 1.

Referring to the drawing, 10 and 11 respectively designate two tank sections, which are arranged in laterally spaced, parallel relationship throughout the length of the truck body. The tank sections may be of any desired cross section, but are shown as true cylinders provided with the usual end walls. The ends of the tank sections and the longitudinal edges of the metal sheets which constitute the cylinders are united in any manner commonly practiced in the sheet metal art, preferably by welding. Inasmuch as this feature forms no part of the present invention it is deemed unnecessary to describe it in greater detail.

Interposed between the tank sections 10 and 11 is a central longitudinally disposed tank-compartment provided with a bottom wall 12 and a top wall 13. These walls may be of any desired cross-section, but it is preferred to give them an arcuate cross-section, the curvature of which conforms to that of a true circle. The longitudinal edges of these walls 12 and 13 are provided with flanges, each of which is secured in suitable manner, for instance by welding, to an adjacent portion of a tank-section 10 or 11, as the case may be. By this arrangement the two tank-sections are rigidly connected and braced by the top and bottom members 12 and 13, respectively, but is preferred to further brace them by means of arcuate sheet metal braces 14, 14a, as shown in the drawing. The walls 12 and 13 are connected with end walls to complete a closed storage space.

The braces 14 cooperate with adjacent portions of tank sections 10 and 11, and top member 13 to provide supplemental chambers 15. In a similar manner the braces 14a cooperate with adjacent portions of tank sections 10 and 11, and bottom member 12 to form supplemental chambers 15a. It is to be understood that all chambers are closed by suitable end walls a. If desired, intercommunication may be provided by openings 16. The tanks may be emptied by suitably positioned cocks 17, one being shown for purposes of illustration.

For purposes of illustration, and without intent to limit the invention in this particular, the truck body is disclosed as designed for trailer truck construction, in which the body is provided at its forward end with a frame 18 for attachment to the rear end of a power-operated cab (not shown) in a well-known manner. An ornamental curtain 19 is shown as depending from the rear end of the truck adjacent the rear wheels. The rear end is supported by wheels W. It is quite obvious that wheels may be substituted for the cab to support the forward end of the body, in a common and well-known manner. No attempt is made to show or describe details of the chassis or frame structure on which the body is mounted, because the same forms no part of the present invention, and chassis design for trucks of this type is a matter of common practice in the art.

The advantages of the invention will be readily understood by those skilled in the art to which it belongs. For instance, it will be readily perceived that by providing the relatively spaced tank sections, separated by an intermediate chamber which extends above and below the plane of said sections, a tank body of very largely increased capacity is provided without unduly widening the truck body. It will also be noted that the top and bottom walls of the intermediate chamber, being of arcuate cross section, provide very strong bracing members for maintaining the spaced relationship of the parallel tank sections, and that these bracing functions are substantially aided by the arcuate bracing plates.

Having thus explained the nature of the invention and described an operative manner of constructing and using the same, although without attempting to set forth all of the forms in which it may be made, or all of the forms of its use, what is claimed is:

A tank-truck body of the character described having in combination a pair of laterally spaced cylindrical tank sections extending longitudinally of the truck body and in parallel relationship, an intermediate tank portion including an upwardly curved arcuate top member rigidly secured throughout its length to top portions of the tank sections and bridging the space between the latter, a downwardly curved arcuate bottom member rigidly secured throughout its length to under portions of the tank sections and also bridging the space between them, and arcuate bracing sheets extending longitudinally of the truck body, said bracing sheets being respectively secured to the exterior of said tank sections and said respective arcuate top and bottom members, the spaces between said sheets and said tanks and members providing supplemental chambers, each of said chambers being in communication with the sections and tank portions adjacent thereto.

GEORGE M. BRANDON.

REFERENCES CITED

The following references are of record in the file of this patent:

UNITED STATES PATENTS

| Number | Name | Date |
|---|---|---|
| 662,452 | MacDonald | Nov. 27, 1900 |
| 1,400,345 | Brile | Dec. 13, 1921 |
| 1,668,179 | Williams | May 1, 1928 |
| 2,041,320 | Bradley et al. | May 19, 1936 |
| 2,054,706 | Morley | Sept. 15, 1936 |
| 2,097,113 | Bradley | Oct. 26, 1937 |
| 2,192,593 | Bradley et al. | Mar. 5, 1940 |
| 2,199,737 | Bernstein | May 7, 1940 |